United States Patent
Walters

[11] Patent Number: 5,715,662
[45] Date of Patent: Feb. 10, 1998

[54] DRIVE SHEAR DEVICE FOR ROTARY CUTTER UNIT

[75] Inventor: James C. Walters, Ottumwa, Iowa

[73] Assignee: Deere & Company, Moline, Ill.

[21] Appl. No.: 560,069

[22] Filed: Nov. 17, 1995

[51] Int. Cl.⁶ ............................................. A01D 75/30
[52] U.S. Cl. ........................... 56/6; 56/13.6; 56/10.3; 464/32; 464/33
[58] Field of Search ....................... 56/6, 255, 295, 56/DIG. 6, DIG. 9, 13.6, 13.5, 10.3, 10.4; 403/2; 464/32, 33, 149, 157

[56] References Cited

U.S. PATENT DOCUMENTS

| | | | |
|---|---|---|---|
| 2,056,785 | 10/1936 | Hanna | 464/32 |
| 2,665,570 | 1/1954 | Ream | 464/33 |
| 4,086,012 | 4/1978 | Buckley et al. | 464/33 X |
| 4,204,589 | 5/1980 | Loker et al. | 464/33 X |
| 4,218,896 | 8/1980 | Van Der Lely | 464/32 |
| 4,365,462 | 12/1982 | Werner et al. | 56/255 |
| 4,414,925 | 11/1983 | Mellin | 464/32 X |
| 4,497,161 | 2/1985 | Vissers et al. | |
| 4,513,563 | 4/1985 | Roser et al. | 464/32 X |
| 4,833,868 | 5/1989 | Ermacora et al. | 56/6 X |
| 4,859,156 | 8/1989 | Kikuchi | 403/2 X |
| 4,955,187 | 9/1990 | Van Der Lely | 56/13.6 |
| 4,986,060 | 1/1991 | Walters et al. | 56/6 |
| 4,999,981 | 3/1991 | Neuerburg | |
| 5,111,644 | 5/1992 | Van Der Lely | 56/6 X |
| 5,443,372 | 8/1995 | Kanoll | 464/32 X |

*Primary Examiner*—Terry Lee Melius
*Assistant Examiner*—Victor Batson

[57] ABSTRACT

Each knife-carrying disk of a rotary cutterbar has a hub connected to a drive shaft through means of a shear device. In a first embodiment of the invention, the shear device is in the form of either a collar or a clamping member having internal splines received on a splined upper end of the drive shaft and having shearable cylindrical drive lugs engaged with complementary shaped openings provided in an upper surface of the disk hub. In another embodiment of the invention, the shear device is in the form of a ring-like shear insert having shearable inner splines received on the splined upper end of the drive shaft and having outer splines engaged with a splined mounting hole of the disk hub.

8 Claims, 4 Drawing Sheets

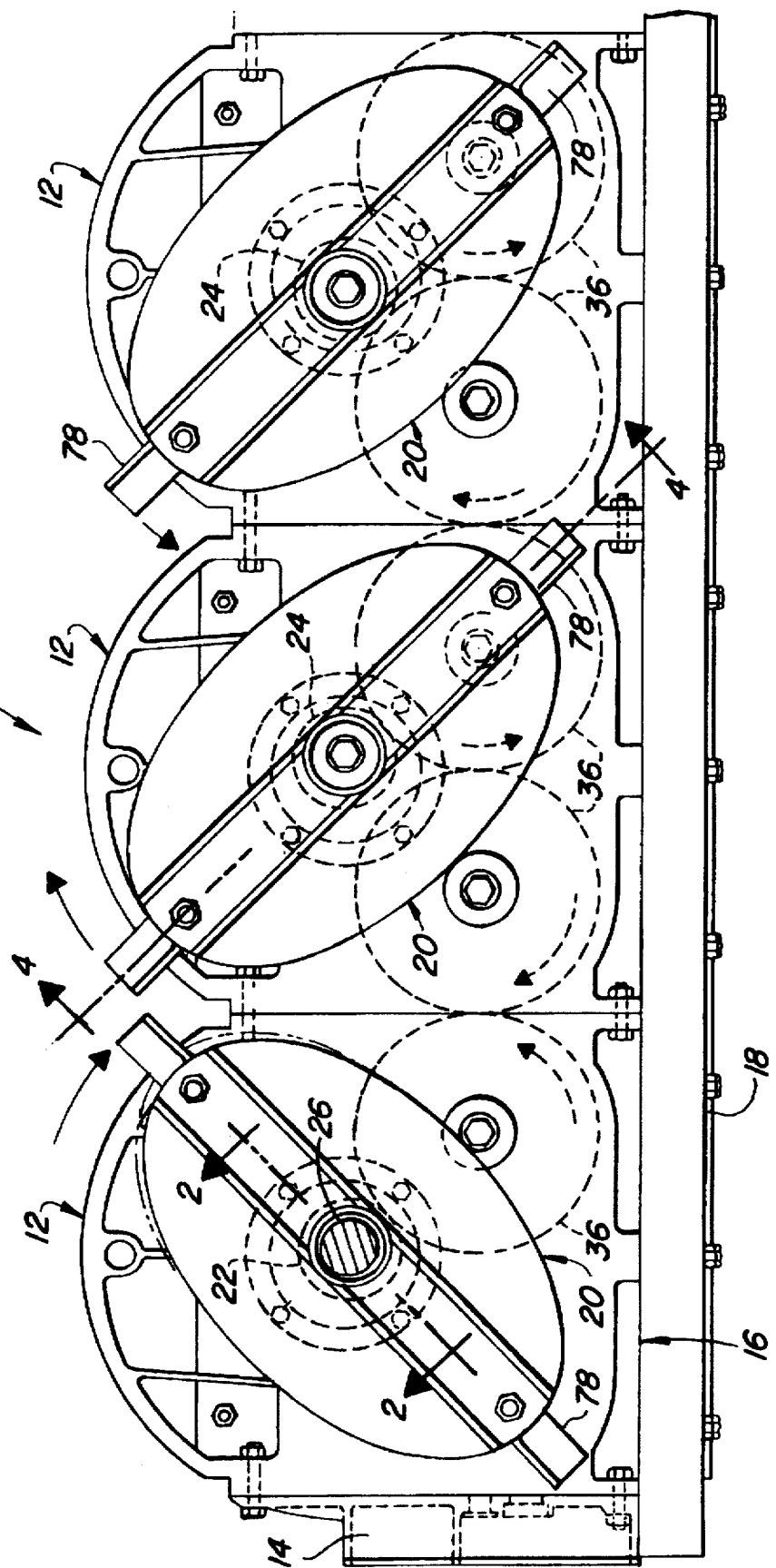

DRIVE SHEAR DEVICE FOR ROTARY CUTTER UNIT

BACKGROUND OF THE INVENTION

The present invention relates to shear devices used for protecting machinery drive components from overloads and more particularly relates to a shear device coupled between a rotary cutter unit disk hub and a drive shaft for the cutter unit.

Typically, rotary mower cutterbars include an elongate housing which contains a train of meshed idler and drive spur gears, or a main power shaft coupled by respective bevel gear sets, for delivering power to respective drive shafts for cutter units spaced along the length of the cutterbar. The cutter units each comprise a cutting disk including diametrically opposite cutting blades and having a hub coupled to an upper end of a given drive shaft, the lower end of the drive shaft carrying a spur gear, in the case where a train of meshed spur gears is used for delivering power, and carrying a bevel gear of a given one of the bevel gear sets, in the case where a main power shaft is used. Of course in either case, bearings are used to support the various shafts. The cutter disks are rotated at a relatively fast speed which makes the drive components, such as gears, bearings or shafts, vulnerable to damage in the event that a foreign object is struck by the rotating disk.

In order to minimize the extent of such possible damage to the components of the drive for the disks, it is known to incorporate a shear device some where in the drive between the disk hub and drive shaft of each unit which will fail upon a predetermined overload being imposed on the device so that the overload is not transferred on to other components of the disk drive.

One known shear device is created by deliberately designing splines coupling the cutter disk hub to the upper end of a respective drive shaft so that the splines fail at a predetermined overload. Another known shear device, disclosed in U.S. Pat. No. 4,999,981, issued to Neuerburg on Mar. 19, 1991, is in the form of an annular notch provided in an upper location of the cutter disk drive shaft. Yet another known shear device, disclosed in U.S. Pat. No. 4,497,161, issued to Vissers et al on Feb. 5, 1985, includes a plurality of shear pins coupling the cutter disk to its hub.

The first two of the above-described known shear devices have the drawback that the part requiring replacement after failure is still somewhat costly, with replacement of shaft of the patented device in addition being relatively difficult. In the case of the two patented devices, there is the further drawback that failure of the disk drive shaft or of the pins coupling the disk to its hub allows the spinning disk to fly free of the machine.

SUMMARY OF THE INVENTION

According to the present invention there is provided an improved cutter unit for use with a mower comprising a cutterbar having a plurality of rotary cutter units mounted along the length thereof, and more specifically there is provided an improved shear device coupling the cutter disk hub of each cutter unit to the drive shaft for that unit.

An object of the invention is to provide a rotary cutter unit having a shear device embodied in a relatively inexpensive component which is easy to install.

Yet another object of the invention is to provide a rotary cutter unit with a shear device coupled to the drive shaft in such a way that the cutter disk remains intact with the mower after failure of the shear device.

A specific object of the invention is to provide a shear device, which in accordance with a first embodiment, is in the form of a ring-like shear insert having shearable internal or external splines respectively for engaging splines on the exterior of the upper end of a respective cutter disk drive shaft and for engaging internal splines of the cutter disk hub.

Another specific object of the invention is to provide a shear device, which in accordance with a second embodiment, is in the form of a clamping member having a splined connection with the cutter unit drive shaft and having a plurality of shearable, cylindrical drive lugs engaged in holes provided in an upper surface of the cutter disk hub.

These and other objects will become more apparent upon reading the ensuing description together with the appended drawings.

BRIEF DESCRIPTION OF THE DRAWINGS

FIG. 1 is a top plan view of a left end portion of a rotary mower cutterbar, of a type with which the present invention is particularly adapted for use, including an elongate housing containing a train of meshed drive and idler spur gears coupled for delivering power to cutting units spaced along the housing.

DESCRIPTION OF THE PREFERRED EMBODIMENT

Figure 3:
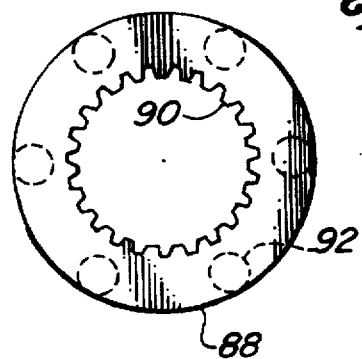
FIG. 3 is a top plan view of the clamping member.

Preliminarily, it should be noted that terms used herein such as "right", "left", "forward", "front", "rearward", and "rear" are with reference to an observer standing behind the structure and facing in the normal direction of forward movement of the structure during its operation.

Referring now to FIG. 1, there is shown a left end segment of a rotary or disk mower cutterbar 10 constructed of a plurality of interconnected, hollow modules 12 which cooperate with each other and with left and right end caps (only left end cap 14 being shown) to form a fluid tight gear housing 16. A stiffener beam 18 is secured across a rear end of the housing 16.

Figure 4:
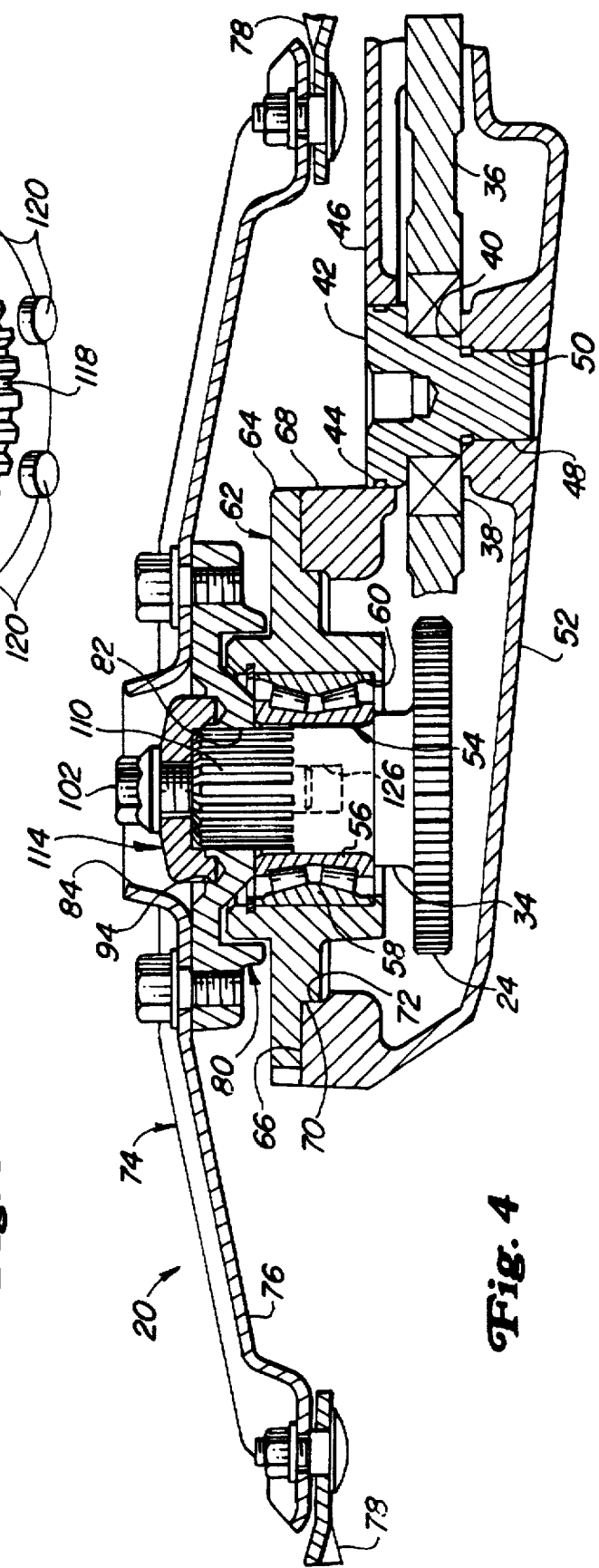
FIG. 4 is a vertical sectional view taken along line 4—4 of FIG. 1 showing a slight variation of the first embodiment of the invention wherein the shear device is in the form of a clamping member.

Cutting units 20 are mounted along the length of the gear housing 16 with one unit each being mounted to each of the modules 12. Power is supplied to the cutting units 20 by a spur gear drive train comprising a plurality of cutting unit drive gears, including a left-most power input pinion gear 22 contained within the left-most housing module 12 and including identical pinion gears 24 respectively contained within the remaining housing modules 12. Power for the cutterbar 10 is delivered from a tractor p.t.o. (not shown), for example, to an input power drive shaft 26 integral with and projecting upwardly from the power input pinion gear 22, as can best be seen in FIG. 2, the gear 22 being coupled for distributing power to the left-most cutting unit 20 and to the cutting unit pinion gears 24, in a manner described below. Referring now also to FIG. 4, it can be seen that power for the remaining pinion gears 24, and hence for cutting unit drive shafts 34 respectively formed integrally with and projecting upwardly from the gears 24, is transmitted thereto by a plurality of intermeshed idler gears 36 extending across a rear zone of the housing 16, with the left most idler gear being meshed with the power input pinion gear 22. Each idler gear 36 is rotatably mounted, as by a bearing 38, on an idler shaft 40 having an enlarged upper end 42, tightly received in a hole 44 provided in an top wall 46 of the housing 16, and having a threaded lower end 48 screwed into a threaded hole 50 provided in a bottom wall 52 of the housing.

The input power drive shaft 26 and each of the drive shafts 34 are mounted to the gear housing 16 for rotation about respective upright axes by a bearing 54 having an inner race 56 pressed onto the shaft 26 or 34 and having an outer race 58 pressed into a cylindrical opening 60, of a bearing housing 62, through which the shaft 26 or 34 projects. The bearing housing 62 has an annular flange 64 bolted to an annular surface 66 of a raised cylindrical portion 68 of the gear housing top wall 46. Each bearing housing 62 has a cylindrical pilot portion 70 received in a pilot hole 72 provided in the gear housing cylindrical portion 68.

Figure 2:
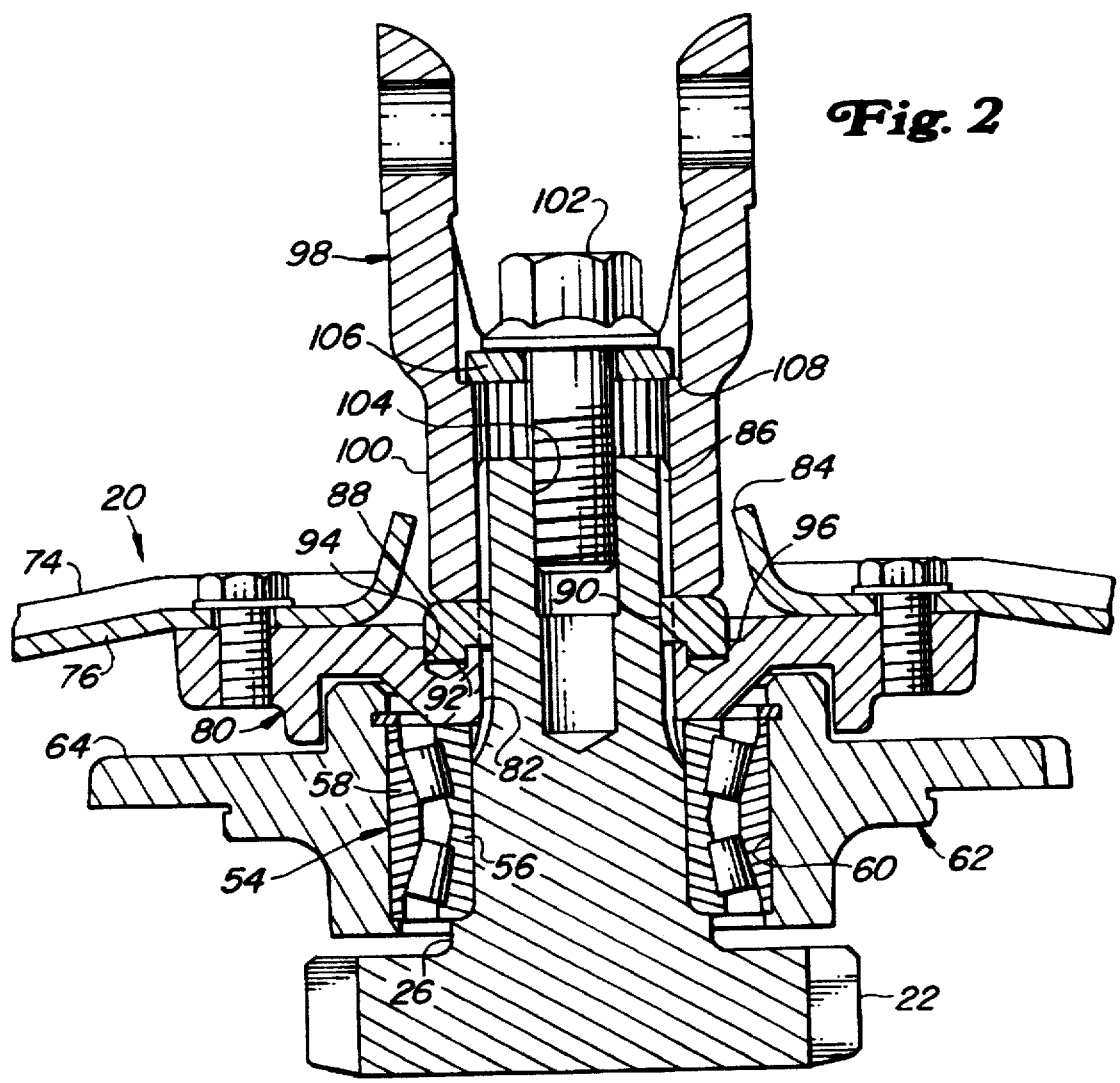
FIG. 2 is an enlarged vertical sectional view taken along line 2—2 of FIG. 1 showing a first embodiment of the invention comprising a shear device in the form of a collar establishing a drive connection between the cutting disk hub and the input drive shaft for the cutterbar.

Each cutting unit 20 includes a cutting disk 74 comprising an oval-shaped body 76 having a pair of knives 78 respectively pivotally mounted to opposite outer locations along a major diameter thereof. A disk hub 80 is bolted to a central, underside location of the body 76 and is provided with a smooth central opening 82, in accordance with a first embodiment of the invention, that is disposed in axial alignment with a hole 84 provided in the body 76. As shown in FIG. 2, an upper end portion of the input power drive shaft 26 is defined by a splined section 86 that extends upwardly through the hub central opening 82 and disk body hole 84. A shear device in the form of a shear collar 88 is provided for establishing a drive connection between the shaft 26 and the hub 80. Specifically, the collar 88 includes internal splines 90 engaged with the splined section 86 of the shaft 26 at a location just above the hub 80. A plurality of frangible or shearable cylindrical drive lugs 92 project downwardly in a circular pattern from a bottom surface of the collar 88 and are received in complementary cylindrical holes 94 provided in an annular top surface 96 of the hub 80. Serving the functions of permitting a source of power to be coupled to the input power drive shaft 28 and as a clamping member holding the shear collar 88 in tight engagement with the hub 80 and the hub 80 in tight engagement with the inner race 56 of the bearing 54 is a u-joint yoke 98 having an internally splined lower cylindrical tubular end 100 received on the splined section 86 of the shaft 26 and having a lower end engaged with the shear collar 88. A flanged head clamping bolt 102 is threaded into a threaded bore 104 extending axially into the shaft 26 and has a flanged head engaged with a washer 106 seated against an upwardly facing shoulder 108 of the yoke 96.

It is here noted that because there is no need for the drive shafts 34 to extend above the cutting disks 74 respectively associated therewith, the mode of connecting each of the drive shafts 34 to an associated one of the hubs 80 differs slightly from the structure just described for connecting the shaft 26 to the hub 80 associated therewith and that only the different structure is given different reference numerals.

Figure 6:
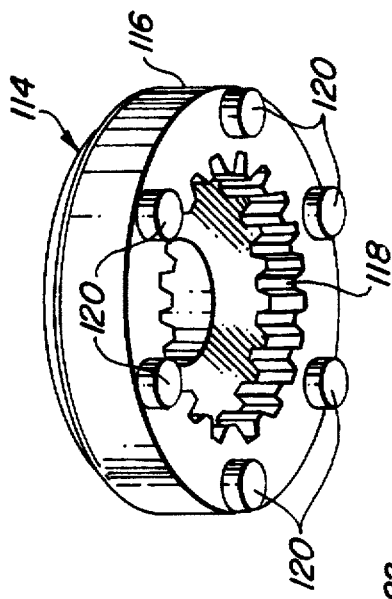
FIG. 6 is a bottom perspective view of the shear device shown in FIG. 4.
Figure 5:
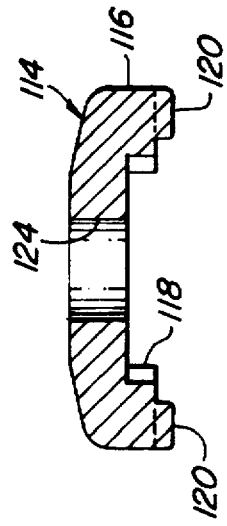
FIG. 5 is an enlarged vertical sectional view of the shear device shown in FIG. 4.

Specifically, with reference to FIG. 4, it can be seen that the shaft 34 has a splined upper end section 110 terminating at a level approximately equal to that of the top of the hub 80, the hub having its smooth opening 82 received on the shaft 34. Instead of a shear collar, a shear device in the form of a cap-like clamping member 114 is used for transferring torque from the shaft 34 to the hub 80. Referring also to FIGS. 5 and 6, it can be seen that the clamping member 114 has an annular lower portion 116 provided with interior splines 118 engaged with the splined section 110 of the shaft 34. A plurality of downwardly projecting, cylindrical, frangible or shearable drive lugs 120 are located in a circular pattern on the bottom of the annular portion 116 and are received in the complementary shaped cylindrical openings 94 provided in the disk hub 80, whereby torque is transferred from the shaft 34 to the disk hub 80 via the clamping member 114. Acting on the clamping member 114 so as to keep the lugs 120 seated in the hub openings 94 and the disk hub 80 seated against the top of the inner bearing race 56 is another clamping bolt 102 which extends through a hole 124 provided in the clamping member 114 and is threaded into a threaded hole 126 extending axially into the drive shaft 34.

The shear strength of the drive lugs 92, in the case of the shear collar 88, and the drive lugs 120, in the case of the clamping member 114, is chosen such that they will shear upon a predetermined overload being transferred thereto, as when the cutting disk 74 engages an obstacle, for example. It has been found that adequate shear strength can be manufactured into the shear collar 88 or each clamping member 114 by using relatively inexpensive powdered metallurgy techniques.

It will be appreciated that the clamping bolts 102, respectively associated with the power input shaft 26 and disk drive shafts 34, will hold each cutting disk 74 intact with the remainder of the cutterbar 10 after the drive lugs 92 or 120 have been sheared. Further, replacement of the damaged shear collar 88 or clamping member 114 is a simple task requiring only the removal of the associated clamping bolt 102.

Also, it is noted that shear collars 88 could be used instead of the clamping members 114 for transferring torque from the drive shafts 34 to the disk hubs 80 but a further clamping member would then have to be installed between the clamping bolt 102 and the shear collar 88.

Figure 8:
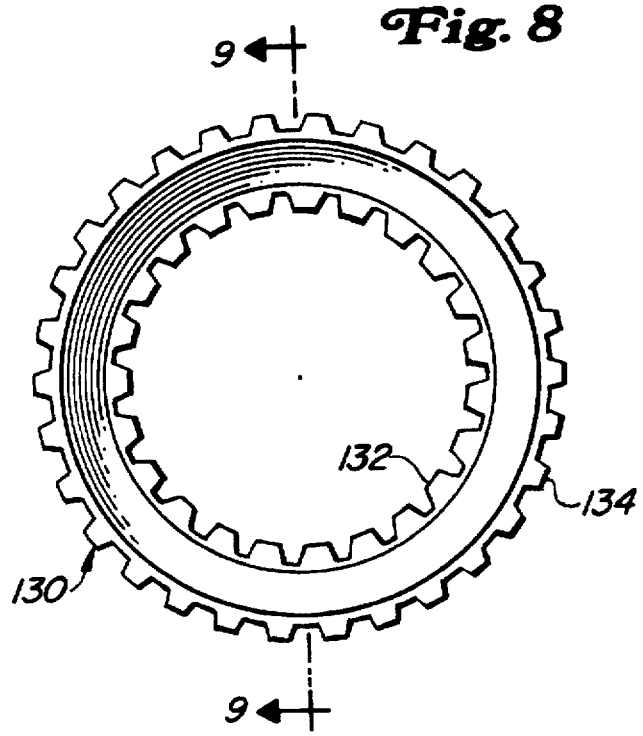
FIG. 8 is a top plan view of the shear insert.
Figure 9:
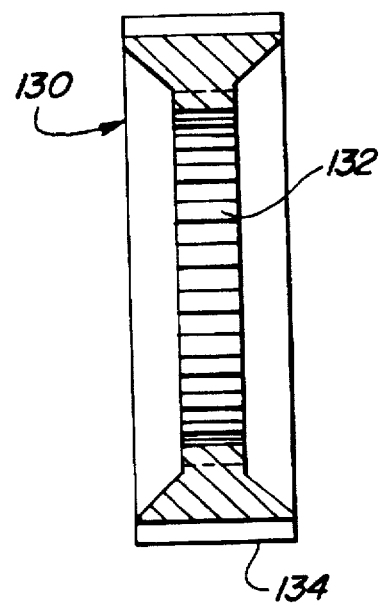
FIG. 9 is a vertical sectional view taken along line 9—9 of FIG. 8.
Figure 7:
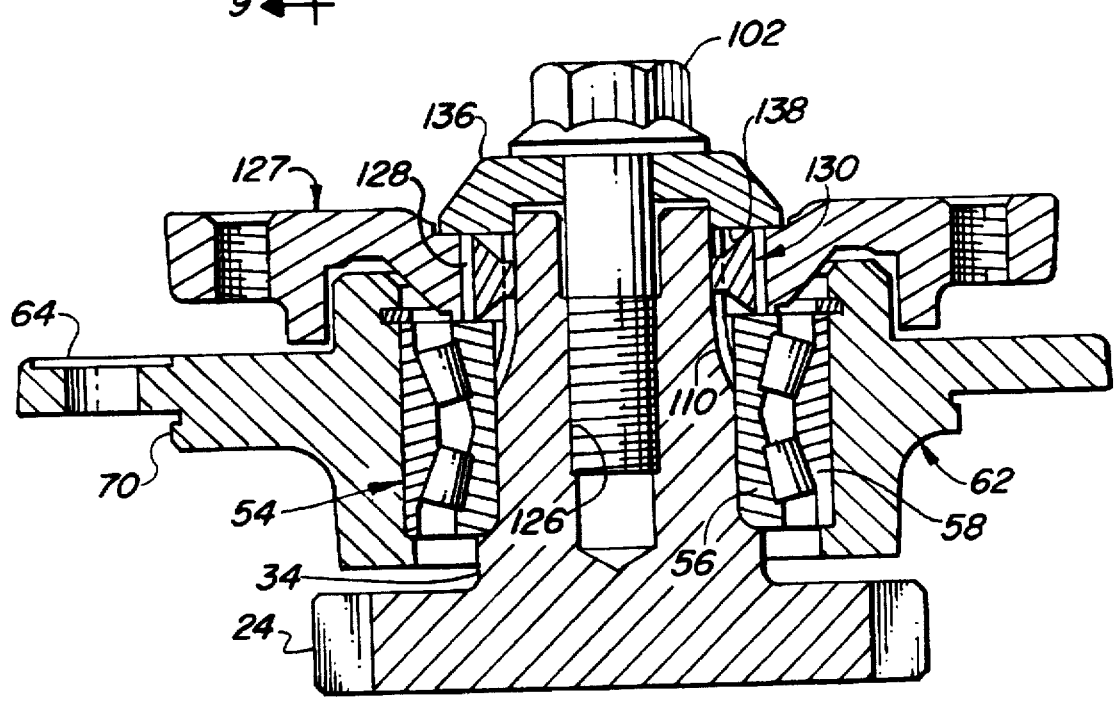
FIG. 7 is a vertical sectional view taken of a second embodiment of the invention comprising a shear device in the form of a ring-like shear insert connecting the drive shaft to the cutting disk hub.

Referring now to FIGS. 7-9, there is shown a shear device, constructed in accordance with a second embodiment of the invention, for transferring torque from the power input drive shaft 26 or disk drive shafts 34 to the respective cutting disks 74, with the drawings depicting the shear device only in conjunction with one of the shafts 34 as the shear device for the drive shaft 26 would be identical. Only the parts which are different from those previously described are given new numbers.

Specifically, it should be noted that, instead of the disk hub 80 a disk hub 127 is used which has a central splined opening 128 disposed in spaced concentric relationship to the splined upper end section 110 of the disk drive shaft 34. A ring-like shear insert 130 is received on the upper end of the drive shaft 34 and has an inner splines 132 engaged with the splined upper end section of the shaft and has outer splines 134 engaged with the splined opening 128 of the hub 126. A cap-like clamping member 136 is received on the top of the shaft 34 and has an annular bottom surface 138 engaged with both the hub 126 and the shear insert 130. Received through the clamping member 136 and acting through it so as to hold the hub 126 and shear insert 130 in tight engagement with the inner race 56 of the bearing 54 is one of the clamping bolts 102, the latter being threaded into the bore 126 provided in the shaft 34. It is to be noted that the shear insert inner splines 132 are only about one-third the length of the outer splines 134 and are designed to shear when an overload is experienced, the clamping bolt 102 and clamping member 136 cooperating to retain the associated disk 74 intact with the remainder of the cutterbar 10 after failure of the shear insert 130. It will be appreciated that replacement of a failed shear insert 130 is a simple task requiring only the removal of the clamping bolt 102 and clamping member 136. Also, as with the previously described shear collar 88 and clamping member 114, the shear insert 130 may be constructed of powdered metal.

I claim:

1. A rotary mower comprising: at least one cutting unit including a housing; a cutting disk having a mounting hub provided with a centrally located mounting hole; a drive including at least one drive shaft mounted to said housing for rotation about an upright axis; said drive shaft being received in said hub mounting hole, having a splined upper end section and having a threaded bore extending axially thereinto from an upper end thereof; a shear device having splines engaged with the splined upper end section of said upright drive shaft; said shear device and hub respectively having cooperating first and second surface means establishing a drive connection whereby torque is transferred from said upright drive shaft to said hub; one of said splines and first surface means of said shear device being frangible at a preselected overload; and a clamping means for releasably retaining said hub and said shear device on said drive shaft and including a clamping bolt received in said threaded bore of said drive shaft.

2. The rotary mower defined in claim 1 wherein said shear device is in the form of a ring-like shear insert having internal splines received on the splined upper end section of said upright drive shaft and having external splines defining said first cooperating surface means; and said hub having hub splines defining a periphery of said hub mounting hole, said hub splines constituting said second cooperating surface means.

3. The rotary mower defined in claim 2 wherein said internal splines of said shear insert are shorter in length than said external splines and constitute a designed frangible part of said shear insert.

4. The rotary mower defined in claim 1 wherein said shear device is in the form of a clamping member forming part of said clamping means and having an annular lower portion provided with internal splines received on the splined upper end of said upright drive shaft; said annular lower portion of the clamping member further including a plurality of drive lugs arranged in a circular pattern about said upright axis, with said drive lugs defining said cooperating first surface means; said hub having a plurality of openings receiving said lugs and defining said cooperating second surface means; and said lugs constituting a designed frangible part of said clamping member.

5. The rotary mower defined in claim 4 wherein said lugs are cylindrical and said plurality of openings are shaped complementary to said lugs.

6. The rotary mower defined in claim 4 wherein said clamping member is in the form of a cap located on top of the drive shaft; and said clamping bolt extending through said clamping member.

7. The rotary mower defined in claim 1 wherein said shear device is in the form of a shear collar having internal splines received on the splined upper end of said upright drive shaft and having a plurality of drive lugs defining said cooperating first surface means; and said hub having a plurality of openings receiving said lugs and defining said cooperating second surface means.

8. The rotary mower defined in claim 7 wherein said drive lugs are cylindrical and said plurality of openings are shaped complementary to said drive lugs.

* * * * *